UNITED STATES PATENT OFFICE.

ADOLPH BAEYER, OF MUNICH, BAVARIA, ASSIGNOR TO BADISCHE ANILIN AND SODA FABRIK, OF MANNHEIM, GERMANY.

MANUFACTURE OF ARTIFICIAL INDIGO.

SPECIFICATION forming part of Letters Patent No. 259,629, dated June 13, 1882.

Application filed May 11, 1882. (Specimens.)

*To all whom it may concern:*

Be it known that I, ADOLPH BAEYER, a subject of the King of Bavaria, residing at Munich, in the Kingdom of Bavaria and Empire of Germany, have invented new and useful Improvements in the Manufacture of an Artificial Indigo from Toluene, of which the following is a specification.

My invention relates to the production of an artificial indigo from toluene.

My invention is based upon the following facts, which I have first discovered in the course of my studies, regarding the chemical constitution of indigo. These facts are, first, that orthonitrophenylacetic acid on reduction gives oxindol; second, that amido-oxindol prepared from nitroso-oxindol on oxidation gives artificial isatine; third, that artificial isatine on treatment with phosphorpentachloride and subsequent reduction is transformed into an artificial indigo.

In consequence of my discoveries it is possible to produce an artificial indigo by starting from a hydrocarbon of a simple chemical constitution which is a by-product of the manufacture of coal-gas, and to build up by a series of chemical operations the bodies of a complex nature which constitute my artificial indigo. In this series of chemical reactions some may be replaced by their equivalents; but the principle involved—viz., the building up of more complex bodies from toluene, ending in the production of my new artificial indigo—must be preserved. One way of obtaining this result is the following: from toluene, through benzyl chloride, benzyl cyanide, phenylacetic acid, orthonitrophenylacetic acid, oxindol, nitroso-oxindol, amido-oxindol, artificial isatine, isatine chloride, to the new artificial indigo.

I take one hundred parts of toluene and heat it to the boiling-point in an apparatus which is provided with means to condense the arising vapors and to carry the condensed liquid back into the said vessel. Into the boiling liquid I pass a current of chlorine gas. I continue this treatment until the weight of the liquid has increased to about 137.5 parts. The liquid is then purified by distilling, the portion boiling between 170° and 180° centigrade being sufficiently pure benzyl chloride. One hundred parts of benzyl chloride thus prepared are mixed with sixty-six parts of powdered commercial cyanide of potassium and four hundred parts of alcohol of about eighty per cent. The mixture is kept boiling for several hours, care being taken to condense the alcoholic vapors and to carry the condensed liquid back into the still. The end of the reaction is reached when, on boiling a filtered part of the liquid, no further precipitate consisting of chloride of potassium is formed. The alcohol is then distilled off and water added in sufficient quantity to dissolve the chloride of potassium. Crude benzyl cyanide is thus obtained in the form of an oily liquid insoluble in water, and is ready for transformation into phenylacetic acid. One hundred parts of benzyl cyanide are mixed with three hundred parts of commercial muriatic acid of 1.2 specific gravity, and heated in a closed vessel to 140° centigrade for three hours. On cooling, the phenylacetic acid is found separated in the shape of a cake. For its further purification it is crystallized from water and dried at a temperature of about 50° centigrade.

In order to convert phenylacetic acid into orthonitrophenylacetic acid, I take for one hundred parts of phenylacetic acid five hundred parts of fuming nitric acid and heat it in a flat porcelain dish on a boiling-water bath. Into the hot nitric acid I gradually introduce the phenylacetic acid, dilute with water, filter off that part of the nitro-acids which has separated, and obtain the remainder by evaporating the liquid cautiously. The united crops of isomeric nitro-acids are mixed with about four hundred parts of granulated tin and one thousand parts of strong commercial muriatic acid, both reagents being calculated on one hundred parts of phenylacetic acid originally employed. The mass becomes strongly heated and the isomeric nitrophenylacetic acids are transformed into corresponding amidophenylacetic acids. When the mass has become cool again, which is a sign that the reaction is finished, a quantity of water equal to about ten times the volume of the muriatic acid used is added, and the decanted liquid is treated with a current of sulphureted hydrogen until a filtered portion of the liquid ceases to give a further precipitate of stannous sulphide on treatment with sulphureted hydrogen. The liquid is separated from the precipitate by filtration concentrated by evaporation to about a third of its volume, neutralized with marble-dust until no further evolution of carbonic-acid gas is perceptible, and finally boiled for about an hour after the addition of precipitated carbonate of baryta, of which about eleven hundred parts must be taken for one hundred parts of phenylacetic acid employed. The liquid may be separated from the insoluble substances by filtration, and is then mixed and shaken with its own volume of ether. The ether, after being decanted from the watery liquid and being distilled in a proper apparatus, leaves anhydride of orthoamidophenyl-acetic acid, which is identical with oxindol. I take one hundred parts of this oxindol and dissolve it, together with seventy parts of nitrite of sodium, in ten thousand parts of water. To the cold solution I add slowly and while agitating the mixture fifty-five parts of concentrated sulphuric acid previously mixed with about two hundred parts of water. Nitroso-oxindol is formed and separates from the solution in yellow needles. The separation is complete after twenty-four hours. The crystals are collected on a filter and washed. The moist substance, in such a quantity that it contains one hundred parts of dry nitroso-oxindol, is intimately mixed with about two hundred parts of granulated tin and five hundred parts of strong commercial muriatic acid. The mixture becomes strongly heated and nitroso-oxindol is transformed into amido-oxindol. When the mass has become cool again, which is a sign that the reaction is finished, about ten times the volume of the muriatic acid of water is added, and the decanted liquid is treated with a current of sulphureted hydrogen until a filtered portion of the liquid ceases to give a further precipitate of stannous sulphide on treatment with sulphureted hydrogen. The liquid is separated from the precipitate by filtration and boiled briskly for a few minutes in order to remove sulphureted hydrogen, which might be dissolved in the liquid. To the warm liquid is added a concentrated watery solution of perchloride of iron containing about five hundred parts of dry perchloride of iron. Amido-oxindol is transformed into artificial isatine, which is partly precipitated and partly crystallizes from the solution on concentrating and cooling.

I make a mixture of one hundred parts of artificial isatine with one hundred and twenty pounds of pentachloride of phosphorus and one hundred and sixty parts of dry benzole, and heat the mixture to about 80° centigrade until no more hydrochloric-acid gas is set free. The solution thus obtained deposits upon cooling isatine chloride, which is collected on a filter, washed with cold benzole, and dried.

In order to convert isatine chloride thus produced into a coloring-matter, I take about two hundred parts of glacial acetic acid and add thereto while stirring about four hundred parts of zinc-dust, and then add in small portions about one hundred parts of isatine chloride. The mixture is kept agitated until it is decolorized. The filtered solution is afterward exposed to the access of air, whereby the liquid gradually turns blue. It is then thrown into cold water, and the coloring-matter is precipitated thereby, and may be collected on a filter.

The characteristics of this new artificial indigo are as follows: It contains a large percentage of a purple coloring-matter called "indirubin," and therefore colors alcohol intensely purple on being boiled with it. On combustion it leaves an ash containing zinc. Natural indigo differs from this artificial indigo by imparting a reddish-brown color to boiling alcohol and by leaving an ash free of zinc. No other artificial indigo known to me leaves on combustion an ash containing zinc.

What I claim as new, and desire to secure by Letters Patent, is—

1. As a new product, an artificial indigo having the characteristics above set forth.

2. The within-described process of producing an artificial indigo by starting from toluene successively through benzyl chloride, benzyl cyanide, phenylacetic acid, oxindol, nitroso-oxindol, amido-oxindol, artificial isatine, and isatine chloride to the artificial indigo, substantially as set forth.

In testimony whereof I have hereunto set my hand and seal in the presence of two subscribing witnesses.

ADOLPH BAEYER. [L. S.]

Witnesses:
LÜDWIG LUNDBERG,
ADOLF SPIEGEL.